United States Patent [19]

Löffler et al.

[11] Patent Number: 5,629,409
[45] Date of Patent: May 13, 1997

[54] REACTIVE DISAZO DYES HAVING TWO CYANURIC CHLORIDE MECHANISMS

[75] Inventors: Hermann Löffler, Speyer; Manfred Patsch, Wachenheim, both of Germany

[73] Assignee: BASF Aktiengesellschaft, Ludwigshafen, Germany

[21] Appl. No.: 401,991

[22] Filed: Mar. 10, 1995

[30] Foreign Application Priority Data

Mar. 11, 1994 [DE] Germany .................. 44 08 197.9

[51] Int. Cl.$^6$ .................................................. C09B 62/09
[52] U.S. Cl. .................................................. 534/631
[58] Field of Search .................................................. 534/634

[56] References Cited

U.S. PATENT DOCUMENTS 5,149,789  9/1992  Jessen et al. .
5,196,033  3/1993  Taylor .................................. 534/634

FOREIGN PATENT DOCUMENTS 2109879  10/1971  Germany .
1320921  6/1973  United Kingdom .

*Primary Examiner*—Johann Richter
*Assistant Examiner*—John D. Peabody, III
*Attorney, Agent, or Firm*—Oblon, Spivak, McClelland, Maier & Neustadt, P.C.

[57] ABSTRACT

Disazo dyes of the formula

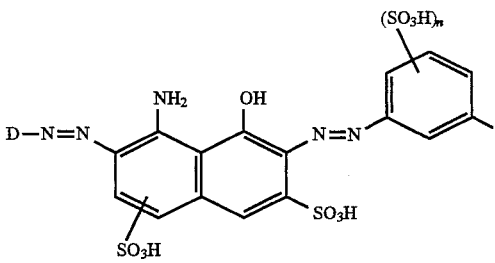

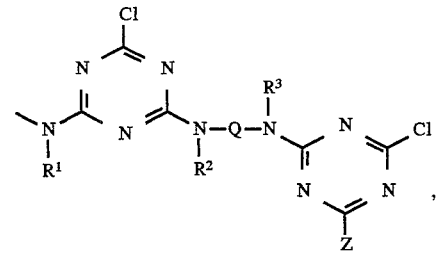

where
n is 0, 1 or 2,
D is a radical of a diazo component which is free of fiber-reactive groups,
$R^1$, $R^2$ and $R^3$ are each hydrogen or unsubstituted or substituted $C_1$–$C_4$-alkyl,
Z is chlorine or unsubstituted or substituted amino and
Q is hydroxysulfonylphenylene,
are used for printing cellulose-containing materials.

9 Claims, No Drawings

REACTIVE DISAZO DYES HAVING TWO CYANURIC CHLORIDE MECHANISMS

The present invention relates to novel disazo dyes of the formula

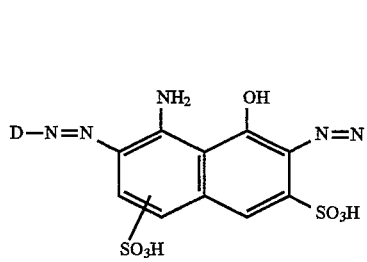 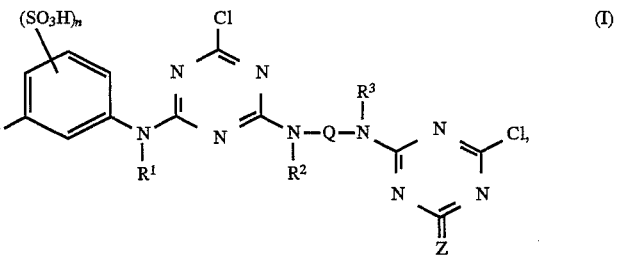

where
n is 0, 1 or 2,
D is unsubstituted or substituted phenyl or unsubstituted or substituted naphthyl, both radicals being free of fiber-reactive groups,
$R^1$, $R^2$ and $R^3$ independently of one another, are each hydrogen or unsubstituted or substituted $C_1$–$C_4$-alkyl,
Z is chlorine or a radical of the formula $NR^4R^5$, where $R^4$ is hydrogen or unsubstituted or substituted $C_1$–$C_4$-alkyl and $R^5$ is hydrogen, unsubstituted or substituted $C_1$–$C_4$-alkyl or unsubstituted or substituted phenyl, and
Q is a radical of the formula

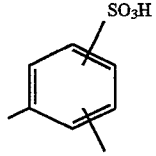

with the proviso that
a) from five to seven groups which impart water solubility are present in the molecule and
b) if Z is $NR^4R^5$, $R^3$ is unsubstituted or substituted $C_1$–$C_4$-alkyl and $R^1$, $R^2$ and $R^4$ are each hydrogen, $NR^2$—Q—$NR^3$ does not have the structure

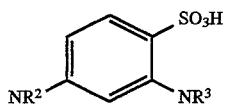

and their use for printing cellulose-containing materials.

U.S. Pat. No. 5,149,789 and DE-A-2 109 879 disclose azo dyes which have a structure similar to that of the abovementioned dyes. However, the dyes stated there have disadvantages in their performance characteristics.

It is an object of the present invention to provide novel reactive disazo dyes having two cyanuric chloride mechanisms. When used as dyes for printing cellulose-containing material, the novel dyes should be capable of being washed out readily and completely after printing and should not color the white ground. They should furthermore give prints of the same intensity on cotton and rayon staple and should have high fixing yields on both substrates.

We have found that this object is achieved by the disazo dyes of formula I which were defined at the outset.

Groups which impart water solubility are in particular hydroxysulfonyl and carboxyl.

All alkyl groups occurring in the abovementioned formula I may be either straight-chain or branched.

Where substituted phenyl or naphthyl radicals occur in the abovementioned formula I, for example, $C_1$–$C_4$-alkyl, $C_1$–$C_4$-alkoxy, amino, halogen, hydroxysulfonyl, carboxyl, sulfamoyl, $C_1$–$C_4$-mono- or dialkylsulfamoyl, whose alkyl radicals are unsubstituted or substituted by hydroxyl, or $C_1$–$C_4$-alkylsulfonyl, which is unsubstituted substituted by hydroxyl, may be suitable as substituents. The substituted phenyl or naphthyl radicals have as a rule from 1 to 3 substituents.

Where substituted alkyl radicals occur in the abovementioned formula I, for example, hydroxyl, $C_1$–$C_4$-alkoxy, hydroxy-$C_1$–$C_4$-alkoxy, sulfato, halogen, $C_1$–$C_4$-alkoxycarbonyl, cyano, carboxyl or hydroxysulfonyl may be suitable as substituents, unless stated otherwise. The substituted alkyl radicals have as a rule 1 or 2 substituents.

Suitable diazo components D-$NH_2$ from which the radical D is derived are, for example, aniline, 2-methoxyaniline, 2-methylaniline, 4-methoxyaniline, 4-methylaniline, 2-methoxy-5-methylaniline, 2,5-dimethoxyaniline, 2,4- or 2,5-dimethylaniline, 2,5-diethoxyaniline, 2-, 3- or 4-chloroaniline, 2,5-dichloroaniline, 4-chloro-2-methylaniline, 3-chloro-2-methylaniline, 4-chloro-2-aminotoluene, aniline-2-, -3- or -4-sulfonic acid, aniline-2,4-disulfonic acid, aniline-2,5-disulfonic acid, aniline-3,5-disulfonic acid, 2-aminotoluene-4-sulfonic acid, 2-methoxyaniline-5-sulfonic acid, 3-methoxyaniline-4-sulfonic acid, 2-methoxyaniline-4-sulfonic acid, 2,5-dimethoxyaniline-4-sulfonic acid, 2,4-dimethoxyaniline-5-sulfonic acid, 2-methoxy-5-methylaniline-4-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2,6-dichloroaniline-4-sulfonic acid, 2,6-dimethylaniline-4-sulfonic acid, 2,6-dimethylaniline-3-sulfonic acid, 2-, 3- or 4-aminobenzoic acid, 4-methylsulfonylaniline, 2-aminotoluene-3,5-disulfonic acid, 4-aminotoluene-2,5-disulfonic acid, 2-chloroaniline-4,6-disulfonic acid, 1- or 2-aminonaphthalene, 3- or 4-(2-hydroxyethylsulfonyl)aniline, 4-sulfamoylaniline, 4-methylsulfamoylaniline, 4-dimethylsulfamolylaniline, 4-(2-hydroxyethylsulfamoyl)aniline, 1-aminonaphthalene-3-, -4-, -5-, -6- or -7-sulfonic acid, 1-aminonaphthalene-3,7-disulfonic acid, 2-aminonaphthalene-5-, -6- or -8-sulfonic acid, 2-aminonaphthalene-1,5-disulfonic acid, 2-aminonaphthalene-1-sulfonic acid, 2-aminonaphthalene-1,6-disulfonic acid or 2-aminonaphthalene-3,6- or -4,8-disulfonic acid.

$R^1$, $R^2$, $R^3$, $R^4$ and $R^5$ are, for example, methyl, ethyl, propyl, isopropyl, butyl, isobutyl, sec-butyl, tert-butyl, 2-hydroxyethyl, 2- or 3-hydroxypropyl, 2- or 4-hydroxybutyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 4-methoxybutyl, 2- or 4-ethoxybutyl, 2-sulfatoethyl, 2- or 3-sulfatopropyl, 2- or 4-sulfatobutyl, cyanomethyl, 2-cyanoethyl, 2- or 3-cyanopropyl, 2- or 4-cyanobutyl, 2-chloroethyl, 2-bromoethyl, 2- or 3-chloropropyl, 2- or 3-bromopropyl, 2- or 4-chlorobutyl, 2- or 4-bromobutyl, 2-(2-hydroxyethoxy)ethyl, carboxymethyl, 2-carboxyethyl, 2- or 3-carboxypropyl, 2- or 4-carboxybutyl, hydroxysulfonylmethyl, 2-hydroxysulfonylethyl, 2- or 3-hydroxysulfonylpropyl or 2- or 4-hydroxysulfonylbutyl.

$R^5$ may furthermore be, for example, phenyl, 2-, 3- or 4-methylphenyl, 2-, 3- or 4-methoxyphenyl, 2-, 3- or 4-hydroxysulfonylphenyl, 2-, 3- or 4-carboxyphenyl, 2,4- or 2,6-dimethylphenyl, 2,4- or 2,6-dimethoxyphenyl, 2-methoxy-4-methylphenyl, 2-methyl-4- or -5-hydroxysulfonylphenyl, 2-methoxy-4- or -5-hydroxysulfonylphenyl, 2-carboxy-4-hydroxysulfonylphenyl, 2,4-dimethyl-5-hydroxysulfonylphenyl, 2,5-dimethyl-4-hydroxysulfonylphenyl, 2,5-dihydroxysulfonylphenyl or 3-amino-4-hydroxysulfonylphenyl.

Preferred disazo dyes of the formula I are those in which six or seven groups which impart water solubility are present in the molecule.

Other preferred disazo dyes of the formula I are those in which Z is a radical of the formula $NR^4R^5$.

Other preferred disazo dyes of the formula I are those in which Z is chlorine.

Other preferred disazo dyes of the formula I are those in which $R^1$, $R^2$, $R^3$ and $R^4$ are not simultaneously hydrogen; when D is phenyl which has at least one substituent which is ortho to the azo group, disazo dyes of the formula I in which $R^1$, $R^2$, $R^3$ and $R^4$ are each hydrogen are also preferred.

Further preferred disazo dyes of the formula I are those in which three of the radicals $R^1$, $R^2$, $R^3$ and $R^4$ are hydrogen and one of the radicals is unsubstituted or substituted $C_1$–$C_4$-alkyl, with the exception of dyes in which $R^3$ is unsubstituted or substituted $C_1$–$C_4$-alkyl.

Where $R^1$, $R^2$, $R^3$ and $R^4$ are not simultaneously hydrogen, the following combinations may be mentioned in particular, H being hydrogen and A being unsubstituted or substituted $C_1$–$C_4$-alkyl.

| | $R^1$ | $R^2$ | $R^3$ | $R^4$ |
|---|---|---|---|---|
| 1. | H | H | H | A |
| 2. | H | H | A | A |
| 3. | H | A | H | A |
| 4. | H | A | H | H |
| 5. | H | A | A | H |
| 6. | H | A | A | A |
| 7. | A | H | H | H |
| 8. | A | H | H | A |
| 9. | A | H | A | H |
| 10. | A | H | A | A |
| 11. | A | A | H | H |
| 12. | A | A | H | A |
| 13. | A | A | A | H |
| 14. | A | A | A | A |

The combinations 1 to 10, in particular 1 to 4, 7 and 8, are preferred, combination 1 being particularly noteworthy.

Other preferred disazo dyes of the formula I are those in which $R^1$, $R^2$, $R^3$ and $R^4$, independently of one another, are each hydrogen or $C_1$–$C_4$-alkyl, in particular methyl or ethyl.

Further preferred disazo dyes of the formula I are those in which $R^5$ is $C_1$–$C_4$-alkyl which is unsubstituted or substituted or in particular phenyl which is unsubstituted or monosubstituted to trisubstituted by methyl, methoxy, carboxyl or hydroxysulfonyl.

Where $R^5$ is $C_1$–$C_4$-alkyl, noteworthy alkyl radicals are those which have a branch at the carbon atom adjacent to the nitrogen atom.

Other preferred disazo dyes of the formula I are those in which D is unsubstituted or substituted phenyl, in particular mono-or dihydroxysulfonylphenyl.

Disazo dyes of the formula Ia

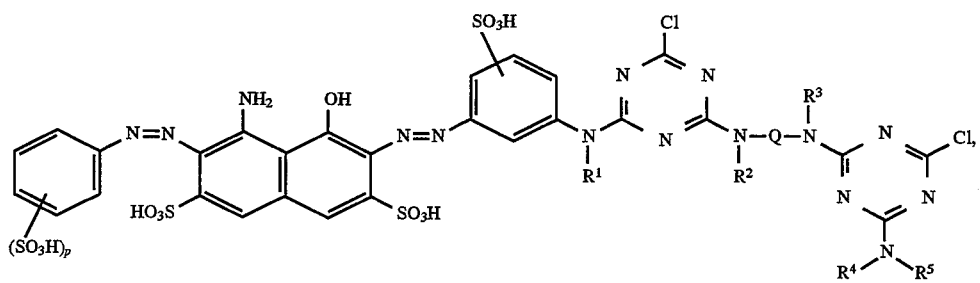

where p is 1 or 2 and Q, $R^1$, $R^2$, $R^3$, $R^4$ and $R^5$ each have the abovementioned meanings, are also preferred.

Disazo dyes of the formula Ib

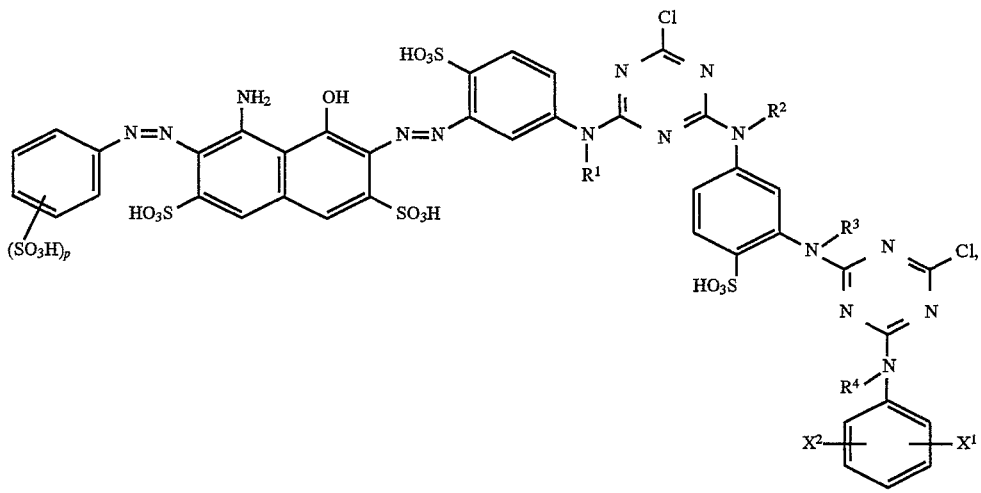

where p is 1 or 2, $X^1$ is hydrogen, carboxyl or hydroxysulfonyl and $X^2$ is hydrogen, methyl, methoxy, carboxyl or hydroxysulfonyl and $R^1$, $R^2$, $R^3$ and $R^4$ each have the abovementioned meanings, are particularly preferred.

Disazo dyes of the formula Ib, where p, $X^1$ and $X^2$ each have the abovementioned meanings, $R^1$, $R^2$ and $R^3$ are each hydrogen and $R^4$ is methyl or ethyl, are very particularly preferred.

The novel disazo dyes of the formula I may also be obtained by methods known per se.

For example, an arylamine of the formula II

where D has the abovementioned meanings, can be diazotized by a method known per se and the product coupled in an acidic medium to a naphthalene of the formula III

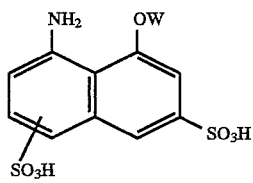

(W=H). The selectivity of strongly electrophilic diazonium salts which are derived from the arylamine II can be increased by using a sulfonylnaphthalene III (W=$SO_2C_6H_5$). After coupling is complete, the benzoyl radical is then eliminated under acidic or, preferably, alkaline conditions.

The resulting intermediate of the formula IV

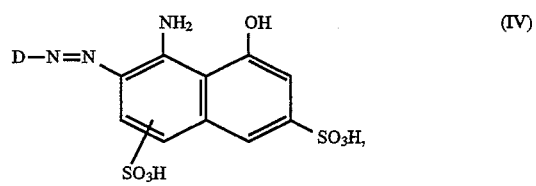

where D has the abovementioned meanings, can then be coupled to a diazonium salt which is derived from a triazinylaniline of the formula V

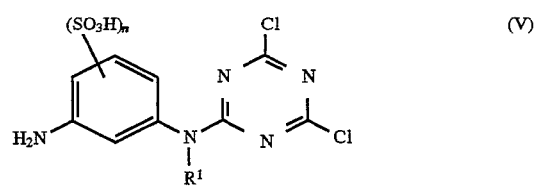

where n and $R^1$ each have the abovementioned meanings. The resulting dichlorotriazine dye of the formula VI

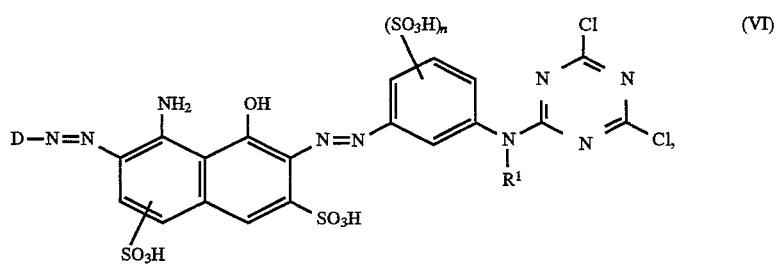

where D, n and $R^1$ each have the abovementioned meanings, can then be reacted first with a phenylenediamine of the formula VII

where $R^2$, $R^3$ and Q each have the abovementioned meanings, then with cyanuric chloride and finally with an amine of the formula VIII

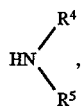

(VIII)

where R⁴ and R⁵ each have the abovementioned meanings.

It is also possible to synthesize the disazo dyes of the formula I in other steps. For example, the dichlorotriazine dye of the formula VI can also be reacted directly with a compound of the formula IX

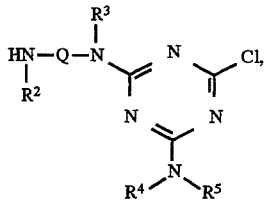

(IX)

where Q, R², R³, R⁴ and R⁵ each have the abovementioned meanings.

It is also possible to prepare the dichlorotriazine dye of the formula VI by first coupling the intermediate IV with the diazonium salt of an aniline of the formula X

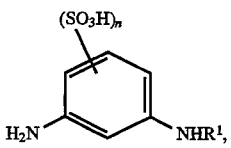

(X)

where n and R¹ each have the abovementioned meanings, and then reacting the product with cyanuric chloride.

The novel reactive disazo dyes of the formula I can advantageously be used for printing cellulose-containing material, in particular cotton, rayon staple or union fabrics thereof. They give prints in greenish-blue to reddish-blue hues having a very high fixing yield. The prints obtained can furthermore be readily and completely washed out, the white ground not being colored by the dye hydrolysis product. Furthermore, the prints on cotton and rayon staple are of the same intensity and have good allround fastnesses.

The examples which follow illustrate the invention.

EXAMPLE 1 a) 16.8 g of 2-(3'-amino-4'-hydroxysulfonylphenylamino)-4,6-dichlorotriazine (moist, calculated as 100%) in 100 ml of water were stirred at a pH of 6. This suspension was diluted with 50 g of ice, and 15 ml of 30% strength by weight hydrochloric acid and 15 ml of aqueous 3.33N sodium nitrite solution were run in successively. After stirring had been continued for one hour at from 5° to 10° C. and the excess nitrous acid had been destroyed, the diazotization was complete.

The suspension of the diazonium betaine was run into a precooled solution of the sodium salt of 28 g of 1-amino-8-hydroxy-2-(2',5'-dihydroxysulfonylphenylazo)naphthalene-3,6-disulfonic acid (obtained by strongly acid coupling of diazotized aniline-2,5-disulfonic acid to 1-amino-8-hydroxynaphthalene-3,6-disulfonic acid) in 300 ml of water, and the pH was brought to 5 with 25% strength by weight aqueous sodium acetate solution. After stirring had been carried out for two hours at from 10° to 15° C., the resulting dye of the formula

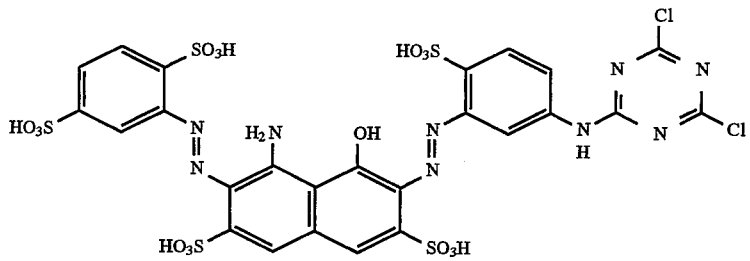

was precipitated by saturation with potassium chloride, filtered off under suction and reacted further as a water-moist filter residue.

b) The aqueous paste from Example 1was dissolved in 250 ml of water at room temperature, and 8.3 g of 3-aminoaniline-4-sulfonic acid were added. Stirring was carried out overnight in the presence of 10% strength by weight aqueous sodium bicarbonate solution (pH 4.5). The resulting blue intermediate of the formula

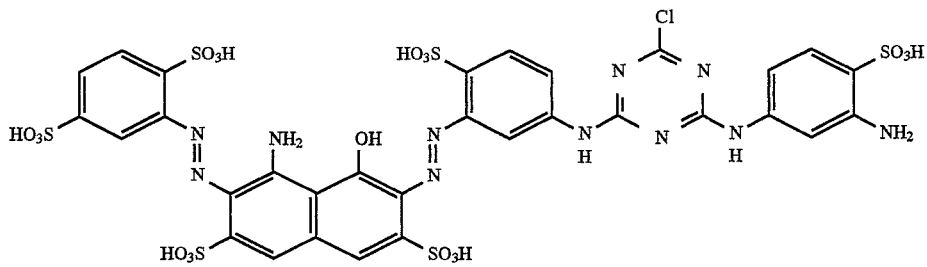

was precipitated with 500 ml of ethanol, filtered off under suction, washed with 80% strength by weight aqueous ethanol and then dried under reduced pressure at room temperature. Yield: 36 g.

c) 24 g of the product from Example 1b were dissolved in 250 ml of water. The solution was stirred with 4.1 g of cyanuric chloride in acetonic solution for 4 hours at room temperature and at a pH of 4, which was obtained with sodium bicarbonate. After acylation was complete, 3.0 g of N-ethylaniline in acetonic solution were added and stirring was carried out overnight at room temperature and at a pH of 6. The synthesis solution was spray-dried.

The salt-containing powder contained, in addition to small amounts of intermediates and hydrolysis products thereof, 23 g of the dye of the formula

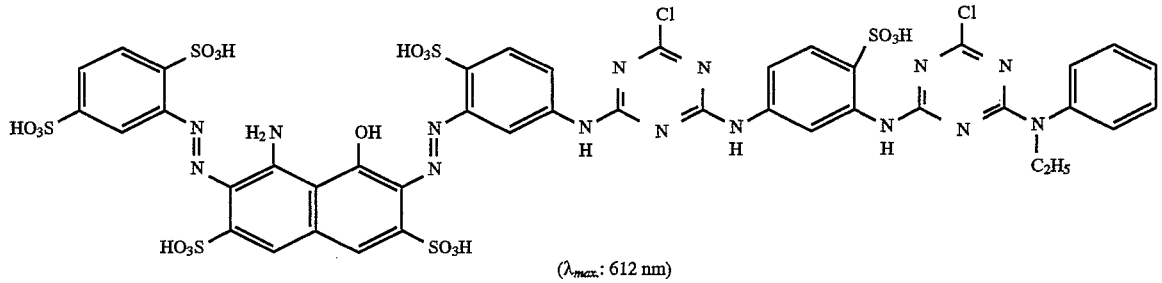

($\lambda_{max}$: 612 nm)

The dyes of Table 1, which are very similar in structure and properties and whose shade is visibly influenced only by the radical D, are obtained similarly to Example 1:

TABLE 1

| D = | (2-methylphenyl-SO₃H) | greenish navy blue |
|---|---|---|
| D = | (4-HO₃S, 2-methylphenyl-SO₃H) | greenish navy blue |
| D = | (phenyl-SO₃H, 3,4-positions) | reddish navy blue |

TABLE 1-continued

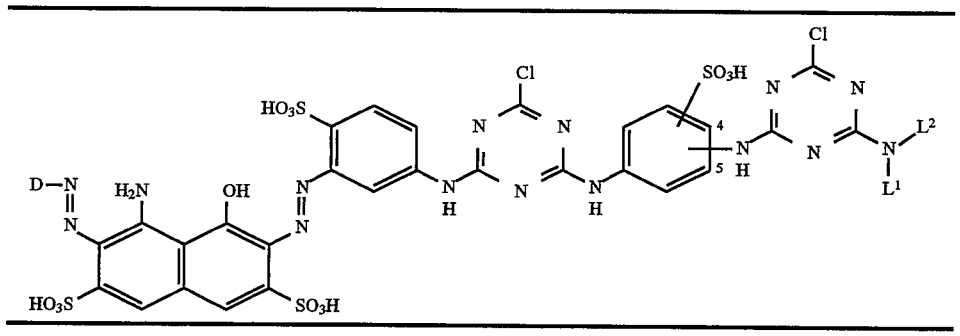

The sulfo and amino groups occupy the ring positions 4 and 5 alternately.

| Ex. No. | D | Ring position of the amino group | L¹ | L² |
|---|---|---|---|---|
| 2 | 2,5-disulfophenyl (SO₃H up, HO₃S down) | 5 | $CH_3$ | phenyl |
| 3 | 2,5-disulfophenyl | 4 | $C_2H_5$ | phenyl |
| 4 | 2,5-disulfophenyl | 5 | $C_2H_5$ | 4-methyl-3-sulfophenyl |
| 5 | 2,5-disulfophenyl | 5 | $CH_3$ | 2-methylphenyl |
| 6 | 2,5-disulfophenyl | 5 | $C_2H_5$ | 2-methylphenyl |
| 7 | 2,5-disulfophenyl | 5 | $CH_3$ | 2-carboxyphenyl |
| 8 | 2,5-disulfophenyl | 4 | $CH_3$ | 2-carboxyphenyl |
| 9 | 2,5-disulfophenyl | 5 | $CH_3$ | 2-sulfophenyl |

-continued

| Ex. No. | D | Ring position of the amino group | $L^1$ | $L^2$ |
|---|---|---|---|---|
| 10 | 2-methyl-4-sulfo-benzenesulfonic acid | 5 | $C_2H_5$ | 2-methylbenzoic acid (o-COOH) |
| 11 | 2-methyl-4-sulfo-benzenesulfonic acid | 4 | $C_2H_5$ | 5-methyl-2-sulfobenzoic acid |
| 12 | 2-methyl-4-sulfo-benzenesulfonic acid | 5 | H | 2,3-dimethylphenyl |
| 13 | 2-methyl-4-sulfo-benzenesulfonic acid | 5 | $CH_3$ | 2-methoxy-methylphenyl |
| 14 | 2-methyl-4-sulfo-benzenesulfonic acid | 5 | $C_2H_5$ | 4-sulfo-methylphenyl |
| 15 | 2-methyl-4-sulfo-benzenesulfonic acid | 4 | $C_2H_5$ | 4-sulfo-methylphenyl |
| 16 | 2-methyl-4-sulfo-benzenesulfonic acid | 5 | $CH_3$ | 4-methoxy-methylphenyl |
| 17 | 2-methyl-4-sulfo-benzenesulfonic acid | 4 | H | 3-sulfo-methylphenyl |
| 18 | 2-methyl-4-sulfo-benzenesulfonic acid | 4 | H | 3-methyl-4-sulfo-methylphenyl |
| 19 | 2-methyl-4-sulfo-benzenesulfonic acid | 4 | H | 2,5-dimethyl-4-sulfo-phenyl (sulfo at 1) |
| 20 | 2-methyl-4-sulfo-benzenesulfonic acid | 5 | H | 2,5-dimethyl-4-sulfo-phenyl (sulfo at 1) |

-continued

| Ex. No. | D | Ring position of the amino group | L¹ | L² |
|---|---|---|---|---|
| 21 | 2-methyl-4-sulfo-benzene with HO₃S at 5-position (SO₃H at 1, CH₃ at 2, SO₃H at 4) | 4 | H | 3-methyl-4-methoxy-benzenesulfonic acid (SO₃H, CH₃, OCH₃) |
| 22 | same as 21 | 4 | H | 2,5-dimethyl-benzenesulfonic acid (CH₃, SO₃H, CH₃) |
| 23 | same as 21 | 5 | H | 2-methoxy-toluene (CH₃, OCH₃) |
| 24 | same as 21 | 5 | H | 3,4-dimethyl-... (CH₃, CH₃, OCH₃) |
| 25 | same as 21 | 5 | C₂H₄OCH₃ | 3-methyl-phenyl (CH₃) |
| 26 | same as 21 | 5 | C₂H₄OCH₃ | phenyl |
| 27 | same as 21 | 5 | C₂H₄CN | phenyl |
| 28 | same as 21 | 5 | CH₂—SO₃H | phenyl |
| 29 | same as 21 | 5 | C₂H₄OC₆H₄OH | phenyl |
| 30 | 4-sulfo-toluene (HO₃S, CH₃) | 5 | C₂H₅ | 3-methyl-4-methyl-benzenesulfonic acid (SO₃H, CH₃, CH₃) |

-continued

| Ex. No. | D | Ring position of the amino group | L¹ | L² |
|---|---|---|---|---|
| 31 | HO₃S–C₆H₄– | 4 | C₂H₅ | 4-CH₃-3-(SO₃H)-C₆H₃– |
| 32 | HO₃S–C₆H₄– | 5 | C₂H₅ | CH₃-C₆H₃(SO₃H)– (isomer mixture) |
| 33 | HO₃S–C₆H₄– | 5 | CH₃ | 2-COOH-C₆H₃– (methyl substituted) |
| 34 | HO₃S–C₆H₄– | 5 | C₂H₅ | 2-COOH-C₆H₃– (methyl substituted) |
| 35 | HO₃S–C₆H₄– | 4 | CH₃ | 4-CH₃-3-COOH-5-(SO₃H)-C₆H₂– |
| 36 | HO₃S–C₆H₄– | 5 | H | 3-CH₃-4-OCH₃-C₆H₂(SO₃H)– |
| 37 | HO₃S–C₆H₄– | 5 | H | 3-CH₃-4-CH₃-C₆H₂(SO₃H)– |
| 38 | 3-SO₃H-C₆H₄– | 5 | C₂H₅ | 3-CH₃-4-CH₃-C₆H₂(SO₃H)– |
| 39 | 3-SO₃H-C₆H₄– | 5 | C₂H₅ | CH₃-C₆H₃(SO₃H)– (isomer mixture) |
| 40 | 3-SO₃H-C₆H₄– | 5 | C₂H₅ | 2-COOH-C₆H₃– (methyl substituted) |

-continued

| Ex. No. | D | Ring position of the amino group | L¹ | L² |
|---|---|---|---|---|
| 41 | 3-SO₃H-phenyl | 4 | CH₃ | 2-methyl-5-SO₃H-phenyl with 4-COOH |
| 42 | 3-SO₃H-phenyl | 5 | H | 3-SO₃H-phenyl |
| 43 | 3-SO₃H-phenyl | 5 | H | 3-methyl-4-CH₃-phenyl with SO₃H |
| 44 | 3-SO₃H-phenyl | 4 | C₂H₅ | 3-methyl-4-CH₃-phenyl with SO₃H |
| 45 | 2-SO₃H-phenyl | 5 | C₂H₅ | 3-methyl-4-CH₃-phenyl with SO₃H |
| 46 | 2-SO₃H-phenyl | 5 | H | 3-SO₃H-phenyl |
| 47 | 2-SO₃H-phenyl | 5 | H | 3-methyl-4-CH₃-phenyl with SO₃H |
| 48 | 2-COOH-phenyl | 5 | C₂H₅ | 3-methyl-4-CH₃-phenyl with SO₃H |
| 49 | 4-COOH-phenyl | 5 | C₂H₅ | 3-methyl-4-CH₃-phenyl with SO₃H |

-continued

| Ex. No. | D | Ring position of the amino group | L¹ | L² |
|---|---|---|---|---|
| 50 | 2-methyl-4-sulfo-benzoic acid (COOH, CH₃, HO₃S) | 5 | $C_2H_5$ | 3-methyl-4-methyl-benzenesulfonic acid (SO₃H, CH₃) |
| 51 | 2-methyl-4-sulfo-benzoic acid (COOH, CH₃, HO₃S) | 4 | $C_2H_5$ | 3-methyl-4-methyl-benzenesulfonic acid (SO₃H, CH₃) |
| 52 | 2-methyl-4-sulfo-benzoic acid (COOH, CH₃, HO₃S) | 5 | $C_2H_5$ | methyl-benzenesulfonic acid —SO₃H (isomer mixture) |
| 53 | 2-methyl-4-sulfo-benzoic acid (COOH, CH₃, HO₃S) | 5 | H | 3-methyl-benzenesulfonic acid (SO₃H) |
| 54 | 2-methyl-4-carboxy-benzoic acid (COOH, CH₃, HOOC) | 5 | $C_2H_5$ | 3-methyl-4-methyl-benzenesulfonic acid (SO₃H, CH₃) |
| 55 | 2-methyl-4-sulfo-benzenesulfonic acid (HO₃S, SO₃H, CH₃) | 5 | $C_2H_5$ | 3-methyl-4-methyl-benzenesulfonic acid (SO₃H, CH₃) |
| 56 | 2-methyl-4-sulfo-benzenesulfonic acid (HO₃S, SO₃H, CH₃) | 4 | $C_2H_5$ | 3-methyl-4-methyl-benzenesulfonic acid (SO₃H, CH₃) |
| 57 | 2-methyl-4-sulfo-benzenesulfonic acid (HO₃S, SO₃H, CH₃) | 5 | $C_2H_5$ | methyl-benzene |
| 58 | 2,6-dimethyl-4-sulfo-benzenesulfonic acid (HO₃S, SO₃H, CH₃, CH₃) | 5 | $C_2H_5$ | methyl-benzene |
| 59 | 3,5-disulfo-2-methyl-benzoic acid (HO₃S, COOH, CH₃, SO₃H) | 5 | $C_2H_5$ | methyl-benzene |

| Ex. No. | D | Ring position of the amino group | L$^1$ | L$^2$ |
|---|---|---|---|---|
| 60 | HO$_3$S-, COOH, SO$_3$H (benzene with HO$_3$S, COOH, CH$_3$, SO$_3$H) | 4 | C$_2$H$_5$ | phenyl |

EXAMPLE 61

The aqueous paste from Example 1a was dissolved in 250 ml of water, and 18.5 g of 2-(N-ethyl-N-phenylamino)-4-chloro-6-(3'-amino-4'-hydroxysulfonylphenylamino) triazine were added. The pH was brought to 5 with 10% strength by weight aqueous sodium bicarbonate solution, and stirring was carried out for hours at 50° C. The dye of the formula

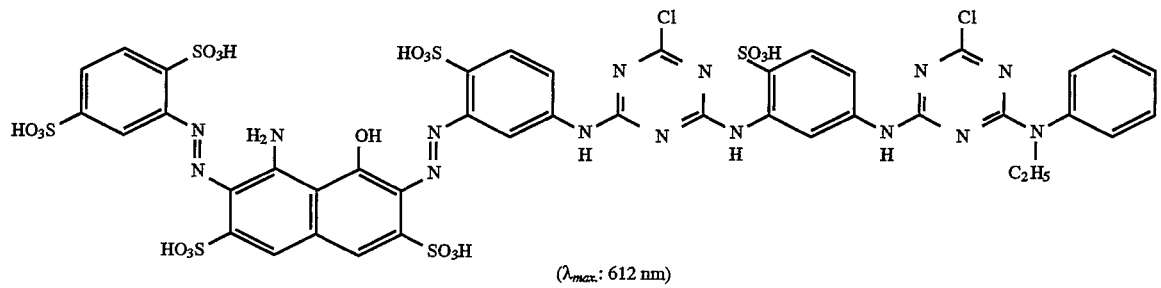

($\lambda_{max}$: 612 nm)

was precipitated with 2,500 ml of ethanol, filtered off under suction, washed with 85% strength by weight aqueous ethanol and dried at room temperature under reduced pressure. 48 g of the hexasodium salt were obtained. When applied to cotton and rayon staple by the reactive printing method, the dye colors both substrates equally intensely in a greenish blue hue having very high fixing rates and good allround fastnesses.

The dyes of Table 2, obtained under the preparation conditions of Example 61, correspond in the shades and the fastness properties to the products of Examples 1 to 60 but are predominantly rather less substantive.

TABLE 2

| Ex. No. | D | Ring position of the amino group | L$^1$ | L$^2$ |
|---|---|---|---|---|
| 62 | benzene with SO$_3$H, HO$_3$S, CH$_3$ substituents | 5 | C$_2$H$_5$ | o-tolyl (CH$_3$) |
| 63 | benzene with SO$_3$H, HO$_3$S, CH$_3$ substituents | 5 | CH$_3$ | o-tolyl (CH$_3$) |

TABLE 2-continued

[Structure: D—N=N— attached to naphthalene core bearing H$_2$N, OH, HO$_3$S, SO$_3$H groups, linked via —N=N— to a phenyl ring (SO$_3$H, Cl substituents) connected through —NH—C(=N)—NH— guanidine linkages to another sulfonated phenyl ring, terminating in a chlorotriazine with NL$^1$L$^2$ substituents. Ring positions 4 and 5 indicated on central phenyl.]

| Ex. No. | D | Ring position of the amino group | L$^1$ | L$^2$ |
|---|---|---|---|---|
| 64 | 2-methyl-4-sulfo-phenyl-1-sulfonic acid (SO$_3$H, HO$_3$S, CH$_3$) | 4 | C$_2$H$_5$ | 2-methylphenyl (CH$_3$) |
| 65 | 2-methyl-4-sulfo-phenyl-1-sulfonic acid | 4 | C$_2$H$_5$ | 3-methyl-4-sulfophenyl (SO$_3$H, CH$_3$) |
| 66 | 2-methyl-4-sulfo-phenyl-1-sulfonic acid | 5 | C$_2$H$_5$ | 3-methyl-4-sulfophenyl (SO$_3$H, CH$_3$) |
| 67 | 2-methyl-4-sulfo-phenyl-1-sulfonic acid | 5 | C$_2$H$_4$OCH$_3$ | phenyl |
| 68 | 2-methyl-4-sulfo-phenyl-1-sulfonic acid | 5 | CH$_3$ | 2-carboxyphenyl (COOH) |
| 69 | 2-methyl-4-sulfo-phenyl-1-sulfonic acid | 4 | C$_2$H$_5$ | sulfophenyl —SO$_3$H (isomer mixture) |
| 70 | 2-methyl-4-sulfo-phenyl-1-sulfonic acid | 5 | H | 2-methylphenyl (CH$_3$) |
| 71 | 4-sulfophenyl (HO$_3$S) | 5 | C$_2$H$_5$ | 3-methyl-4-sulfophenyl (SO$_3$H, CH$_3$) |

TABLE 2-continued

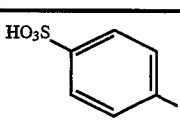

| Ex. No. | D | Ring position of the amino group | L¹ | L² |
|---|---|---|---|---|
| 72 | 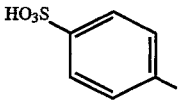 HO₃S— | 4 | C₂H₅ | SO₃H, CH₃ substituted phenyl |
| 73 | HO₃S— phenyl | 5 | C₂H₅ | phenyl-COOH (ortho-methyl) |
| 74 | HO₃S— phenyl | 5 | C₂H₅ | SO₃H, COOH substituted phenyl |
| 75 | HO₃S— phenyl | 4 | C₂H₅ | SO₃H, COOH substituted phenyl |
| 76 | HO₃S— phenyl | 4 | C₂H₅ | —SO₃H phenyl (isomer mixture) |
| 77 | HO₃S— phenyl | 5 | C₂H₅ | —SO₃H phenyl (isomer mixture) |
| 78 | HO₃S— phenyl | 5 | H | —SO₃H phenyl (isomer mixture) |
| 79 | SO₃H phenyl (meta) | 5 | C₂H₅ | SO₃H, CH₃ substituted phenyl |

TABLE 2-continued

[Structure shown at top of table with D-N=N, H₂N, OH, HO₃S, SO₃H groups on naphthalene linked via azo and triazine bridges with Cl substituents to aniline with L¹, L² substituents]

| Ex. No. | D | Ring position of the amino group | L¹ | L² |
|---|---|---|---|---|
| 80 | 3-SO₃H-phenyl | 5 | C₂H₅ | methyl-phenyl-SO₃H (isomer mixture) |
| 81 | 3-SO₃H-phenyl | 5 | C₂H₅ | methyl-phenyl with SO₃H and COOH |
| 82 | 3-SO₃H-phenyl | 4 | H | methyl-phenyl with 2 SO₃H groups |
| 83 | 3-SO₃H-phenyl | 5 | C₂H₅ | methyl-phenyl-OCH₃ |
| 84 | 2-SO₃H-phenyl | 5 | C₂H₅ | methyl-phenyl with SO₃H and CH₃ |
| 85 | 2-SO₃H-phenyl | 5 | H | methyl-phenyl-SO₃H |
| 86 | 2-SO₃H-phenyl | 5 | H | methyl-phenyl with 2 SO₃H groups |
| 87 | 2-SO₃H-phenyl | 5 | C₂H₅ | methyl-phenyl-SO₃H (isomer mixture) |

TABLE 2-continued

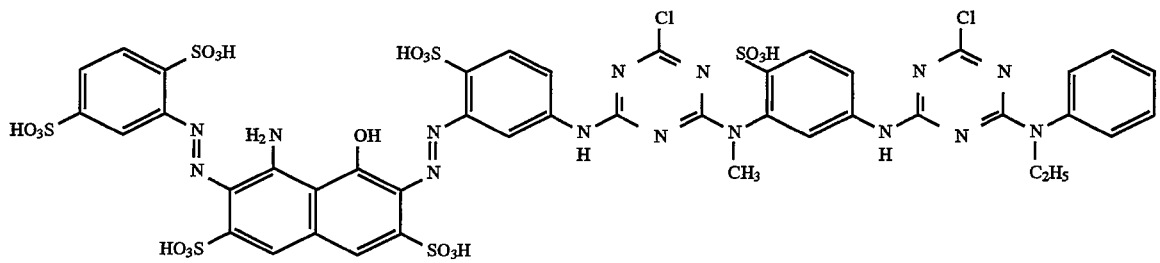

| Ex. No. | D | Ring position of the amino group | L¹ | L² |
|---|---|---|---|---|
| 88 | HO₃S-C₆H₃-SO₃H | 5 | $C_2H_5$ | phenyl |
| 89 | HO₃S-C₆H₃-SO₃H | 5 | $CH_3$ | phenyl |

EXAMPLE 90 a) 273 g of sodium 3-N-methylaminoaniline-4-sulfonate (moist, calculated as 100%) were dissolved in 750 ml of water. This solution was run into a suspension of 203 g of cyanuric chloride in 1,000 ml of ice water at from 5° to 10° C. in such a way that the pH of 2 was not exceeded. When the aniline was completely acylated, a solution of 133 g of N-ethylaniline in 750 ml of acetone was added and the pH was increased to 5 with sodium bicarbonate. After stirring had been carried out overnight at room temperature and at a pH of 5, the acetone substantially evaporating, the product of the formula

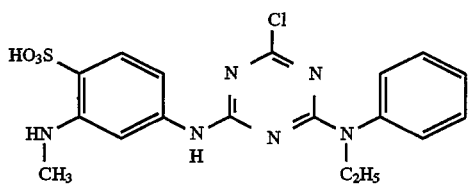

was filtered off under suction and was further processed as a paste.

b) 19.2 g of the product described under a) was stirred with the dye paste of Example 1a in 300 ml of water. The pH was brought to 5 with 10% strength by weight aqueous sodium bicarbonate solution, and stirring was continued for 3 hours at 60° C. After the end of the reaction, the dye of the formula was precipitated with 1,800 ml of ethanol, filtered off under suction, washed with 85% strength by weight aqueous ethanol and dried at room temperature under reduced pressure. 47 g of the dye were obtained in the form of the hexasodium salt, having good technical and fastness properties.

The dyes shown in the table below were obtained in a similar manner. They have a comparable property profile.

TABLE 3

[Structure: D-N=N-[naphthalene with H₂N, OH, HO₃S substituents]-N=N-[phenyl with HO₃S]-NH-C(Cl)=N-C(SO₃H-phenyl-N(CH₃)-)=N-[phenyl ring with positions 4,5]-NH-C(=N-)N=C(Cl)-N(L¹)(L²)]

| Ex. No. | D | Ring position of the amino group | L¹ | L² |
|---|---|---|---|---|
| 91 | 2,5-disulfophenyl (SO₃H, HO₃S) | 5 | $CH_3$ | phenyl |
| 92 | 2,5-disulfophenyl | 5 | H | 2,3-dimethylphenyl |
| 93 | 2,5-disulfophenyl | 5 | $C_2H_4OCH_3$ | phenyl |
| 94 | 2,5-disulfophenyl | 4 | $C_2H_5$ | 3-sulfo-4-methylphenyl |
| 95 | 4-sulfophenyl | 5 | $C_2H_5$ | 3-sulfo-4-methylphenyl |
| 96 | 4-sulfophenyl | 4 | $C_2H_5$ | 3-sulfo-4-methylphenyl |
| 97 | 4-sulfophenyl | 4 | $CH_3$ | 2-methyl-3-carboxy-5-sulfophenyl |
| 98 | 4-sulfophenyl | 5 | $C_2H_5$ | sulfophenyl (isomer mixture) |

TABLE 3-continued
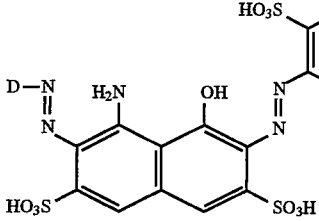
| Ex. No. | D | Ring position of the amino group | L¹ | L² |
|---|---|---|---|---|
| 99 | 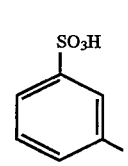 | 5 | H | H |
| 100 | 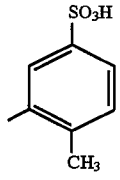 | 5 | $C_2H_5$ | 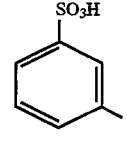 |
| 101 | 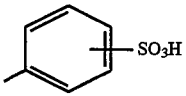 | 5 | $C_2H_5$ | 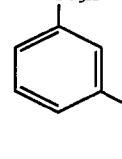<br>(isomer mixture) |
| 102 | 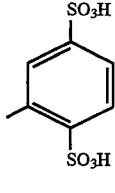 | 5 | H | 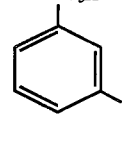 |
| 103 | 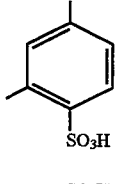 | 4 | H | 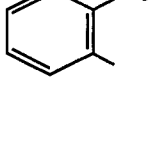 |
| 104 | 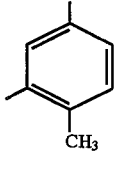 | 5 | $C_2H_5$ | 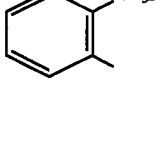 |
| 105 | 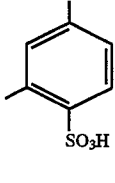 | 5 | H | (see above) |

TABLE 3-continued

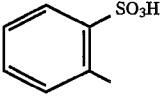

| Ex. No. | D | Ring position of the amino group | L¹ | L² |
|---|---|---|---|---|
| 106 | 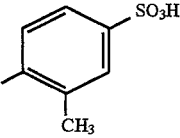 | 5 | H | 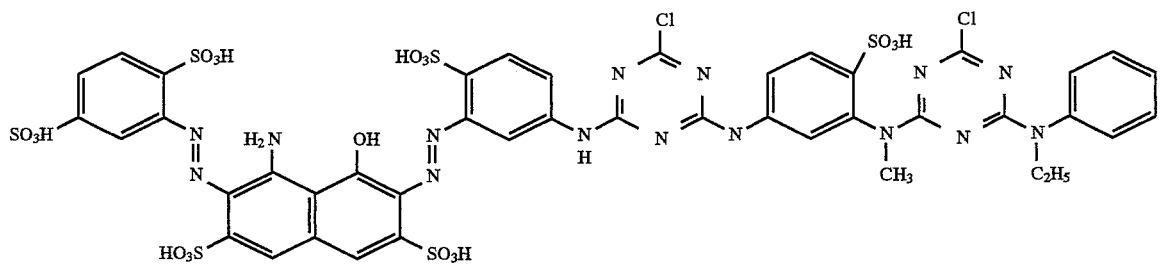 |

EXAMPLE 107

The procedure was similar to Example 1b, except that 10 g of 3-N--methylaminoaniline-4-sulfonic acid were used instead of 3-aminoaniline-4-sulfonic acid and the further procedure was carried out according to Example 1c. The dye of the formula

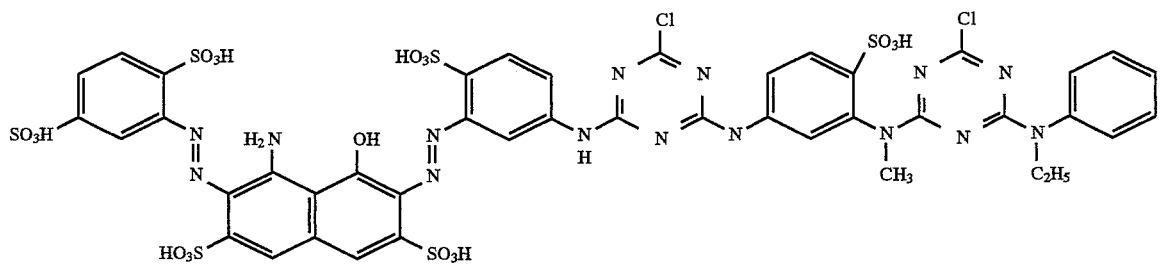

which has advantageous properties, was obtained. The dyes of the formula

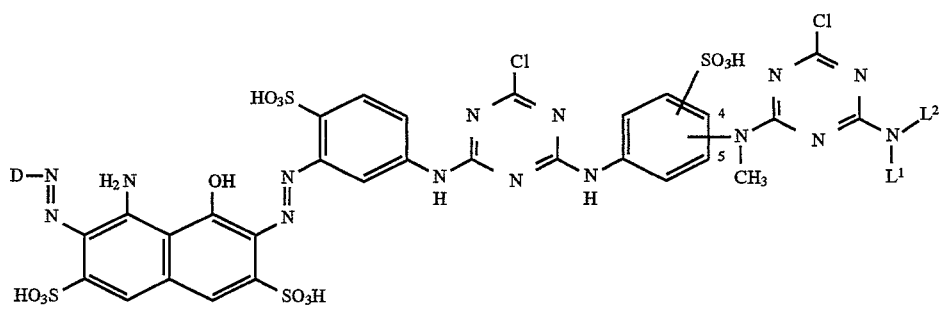

which are shown in Table 4 and likewise have advantageous properties are obtained in a similar manner.

The sulfo and the amino group occupy the ring positions 4 and 5 alternately.

TABLE 4
| Ex. No. | D | Ring position of the amino group | L¹ | L² |
|---|---|---|---|---|
| 108 | 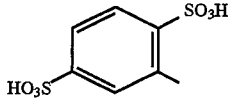 | 5 | $CH_3$ | 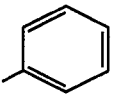 |
| 109 | 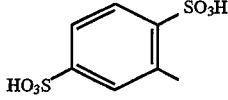 | 4 | $C_2H_5$ | 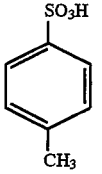 |
| 110 | 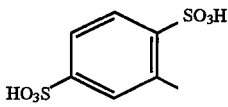 | 4 | $C_2H_5$ | 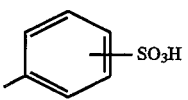<br>(isomer mixture) |
| 111 | 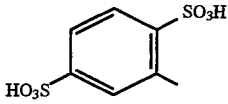 | 5 | $C_2H_5$ | 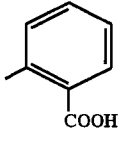 |
| 112 | 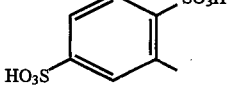 | 4 | $C_2H_5$ | 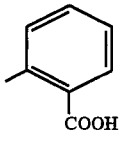 |
| 113 | 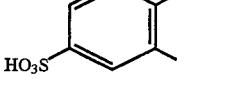 | 4 | H | 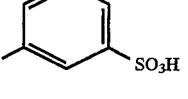 |
| 114 | 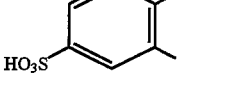 | 5 | H | 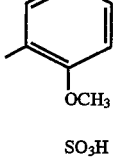 |
| 115 | 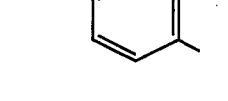 | 4 | $C_2H_5$ | 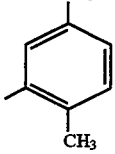 |
| 116 | 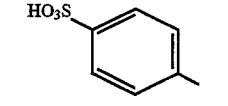 | 5 | $C_2H_5$ | 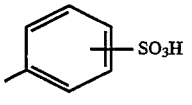<br>(isomer mixture) |
| 117 | 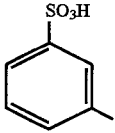 | 5 | $C_2H_5$ | 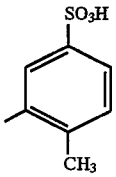 |

TABLE 4-continued

| Ex. No. | D | Ring position of the amino group | L¹ | L² |
|---|---|---|---|---|
| 118 | (2-methyl-benzenesulfonic acid, SO₃H) | 5 | $C_2H_5$ | (3-methyl-4-sulfo-phenyl with SO₃H and CH₃) |
| 119 | (2-methyl-4,5-disulfobenzene; SO₃H and HO₃S) | 5 | $CH_3$ | H |

EXAMPLE 120

26.8 g of sodium 3-aminoaniline-4,6-disulfonic acid (moist, calculated as 100%) were dissolved in 500 ml of water, and 30 ml of 30% strength by weight hydrochloric acid were added. After the addition of 100 g of ice, 62 ml of 1.67N aqueous sodium nitrite solution were added dropwise to the cooled solution. The resulting suspension of the diazonium betaine was poured into the solution of the sodium salt of 57 g of 1-amino-2-(4-hydroxysulfonylphenylazo)-8-hydroxynaphthalene-3,6-disulfonic acid in 500 ml of water, and the pH was brought to 4 with sodium bicarbonate. The dispersion of 20 g of cyanuric chloride in 400 ml of ice water was poured into the resulting solution, and the pH was brought to 3.5 with sodium bicarbonate at about 15° C. Stirring was carried out for 4 hours under these conditions, after which the dye of the formula

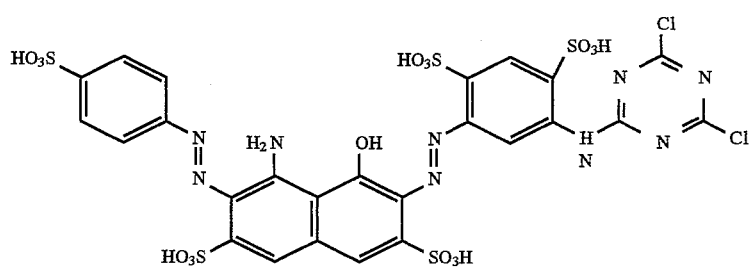

was precipitated by saturation with potassium chloride and was filtered off under suction.

Half the aqueous paste obtained was then reacted in succession with 3-aminoaniline-4-sulfonic acid, cyanuric chloride and N-ethylaniline according to Examples 1b and 1c, and the synthesis solution was spray-dried. The salt-containing dye of the formula

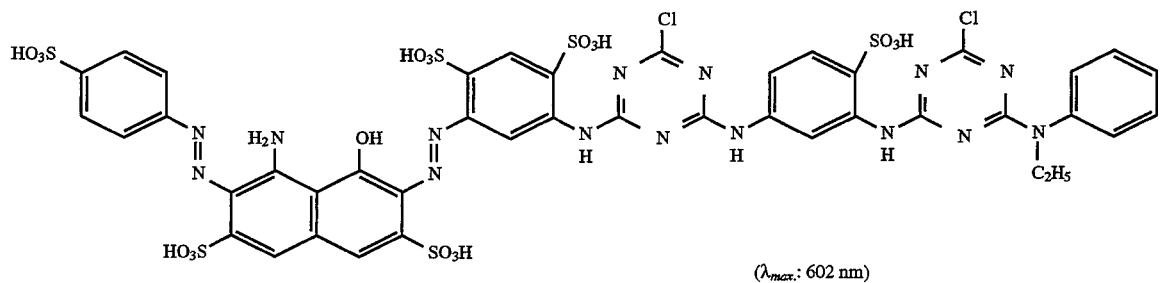

($\lambda_{max}$: 602 nm)

was obtained. Its fastness properties are similar to those of the dye of Example 1, but the dye of Example 120 has a substantially redder hue.

The dyes shown in Table 5 below are obtained in a similar manner.

TABLE 5

| Ex. No. | D | L¹ | L² | L³ | Ring position of SO₃H | L⁴ |
|---|---|---|---|---|---|---|
| 121 | HO₃S–⟨phenyl⟩– | H | H | CH₃ | 4 | 2-methylphenyl |
| 122 | HO₃S–⟨phenyl⟩– | H | H | CH₃ | 4 | 2-methoxyphenyl |
| 123 | HO₃S–⟨phenyl⟩– | H | H | CH₃ | 4 | 2-carboxyphenyl |
| 124 | HO₃S–⟨phenyl⟩– | H | H | C₂H₅ | 4 | 3-sulfo-4-methylphenyl |
| 125 | HO₃S–⟨phenyl⟩– | CH₃ | H | C₂H₅ | 4 | phenyl |
| 126 | HO₃S–⟨phenyl⟩– | CH₃ | H | C₂H₅ | 6 | phenyl |

TABLE 5-continued

[Structure: D—N=N—[naphthalene with H₂N, OH, HO₃S, SO₃H substituents]—N=N—[benzene with HO₃S, SO₃H]—NH—C(=N)—N=C(Cl)—N=C—N(L¹)—[benzene ring with SO₃H at position 4 or 6]—N(L²)—C=N—C(Cl)=N—C—N(L³)(L⁴)]

| Ex. No. | D | L¹ | L² | L³ | Ring position of SO₃H | L⁴ |
|---|---|---|---|---|---|---|
| 127 | 4-HO₃S-C₆H₄- | H | CH₃ | CH₃ | 4 | 2-COOH-C₆H₄- |
| 128 | 4-HO₃S-C₆H₄- | H | H | CH₃ | 6 | 2-OCH₃-C₆H₄- |
| 129 | 3-SO₃H-C₆H₄- | H | H | C₂H₅ | 4 | C₆H₅- |
| 130 | 3-SO₃H-C₆H₄- | H | H | C₂H₅ | 6 | C₆H₅- |
| 131 | 4-HOC₂H₄O₂S-C₆H₄- | H | H | C₂H₅ | 6 | 3-SO₃H-4-CH₃-C₆H₃- |
| 132 | 4-HOC₂H₄O₂S-C₆H₄- | H | H | C₂H₅ | 4 | 3-SO₃H-4-CH₃-C₆H₃- |
| 133 | 4-HOOC-C₆H₄- | H | H | C₂H₅ | 6 | 3-SO₃H-4-CH₃-C₆H₃- |
| 134 | 4-HO₃S-C₆H₄- | H | CH₃ | CH₃ | 4 | C₆H₅- |

TABLE 5-continued

| Ex. No. | D | L¹ | L² | L³ | Ring position of SO₃H | L⁴ |
|---|---|---|---|---|---|---|
| 135 | HO₃S–⟨phenyl⟩–CH₃ | H | CH₃ | CH₃ | 6 | ⟨phenyl⟩ |
| 136 | HO₃S–⟨phenyl(HO₃S)⟩–CH₃ | H | H | H | 4 | H |

EXAMPLE 137 a) 20.2 g of sodium 3-N-methylaminoaniline-4-sulfonic acid (moist, calculated as 100%) were dissolved in 300 ml of water, the solution was cooled from outside and by adding 100 g of ice, and 50 ml of 30% strength by weight hydrochloric acid were first added, followed by the dropwise addition of 60 ml of 3.33N aqueous sodium nitrite solution. Stirring was carried out for 2 hours at from 0° to 5° C., after which the excess nitrous acid was destroyed and the dispersion of the diazonium betaine was poured into the solution of 57 g of disodium 1-amino-2-(4'-hydroxysulfonylphenylazo -8-hydroxynaphthalene-3,6-disulfonate in 250 ml of water. The slow addition of a saturated sodium acetate solution up to a pH of 4.5 terminated the coupling. The nitroso compound formed was likewise destroyed by adding 20 g of amidosulfonic acid and stirring for one hour at room temperature.

The suspension of 20.3 g of cyanuric chloride in 250 ml of ice water was added to the resulting solution, and the pH was brought to 5-6 with sodium bicarbonate. After stirring had been carried out for about 3 hours up to room temperature, the acylation was complete. The dye of the formula was precipitated with sodium chloride and filtered off under suction.

b) The total filter residue of the disazo dye was reacted, under the conditions of Examples 1b and 1c, with 19.0 g of 3-amino-aniline-4-sulfonic acid, 20.0 g of cyanuric chloride and 22 g of 2-N-ethyltoluidine-4-sulfonic acid, and the dye of the formula

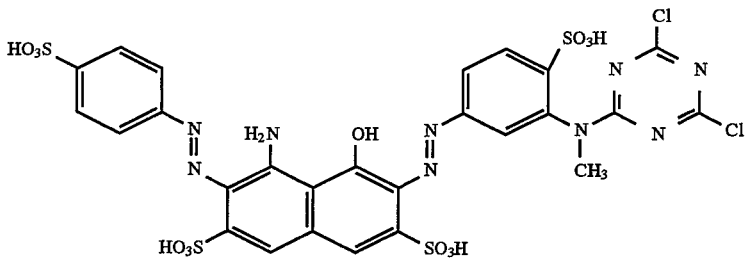

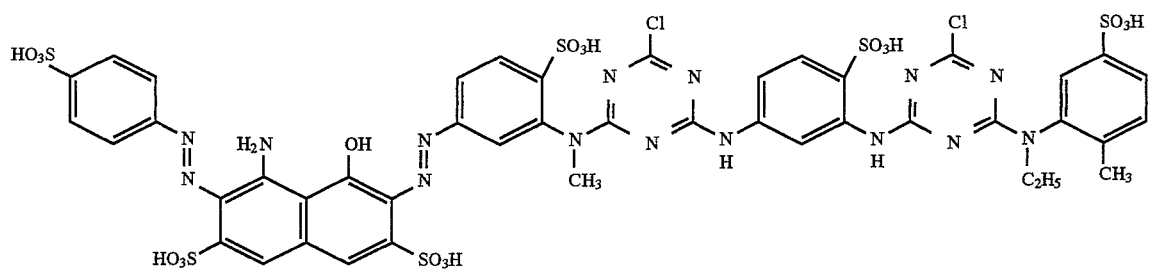

was thus obtained. It is very useful for printing cotton and rayon staple materials.

The dyes shown in Table 6 are obtained in a similar manner.

The sulfo and the amino groups occupy the ring positions 4 and 5 alternately.

TABLE 6

| Ex No. | D | L¹ | L² | Ring position of the amino group | L³ |
|---|---|---|---|---|---|
| 138 | HO₃S–⟨⟩– | H | H | 5 | –⟨⟩–SO₃H (meta) |
| 139 | HO₃S–⟨⟩– | H | H | 4 | –⟨⟩–SO₃H (meta) |
| 140 | 2,4-disulfophenyl | H | H | 5 | H |
| 141 | 2,4-disulfophenyl | H | C₂H₅ | 5 | H |
| 142 | 2,4-disulfophenyl | H | C₂H₅ | 5 | –⟨⟩– (phenyl) |
| 143 | 2,4-disulfophenyl | CH₃ | H | 4 | –⟨⟩–SO₃H (meta) |
| 144 | 2,4-disulfophenyl | CH₃ | CH₃ | 5 | –⟨⟩–COOH (ortho) |

TABLE 6-continued

[Structure: D—N=N—(naphthalene with H₂N, OH, HO₃S, SO₃H substituents)—N=N—(phenyl with SO₃H)—N(CH₃)—C(=N-chlorotriazinyl-NH-)—NH—(phenyl with SO₃H at position 4 or 5)—N(L¹)—C(=N-chlorotriazinyl with Cl, N(L²)L³)]

| Ex No. | D | L¹ | L² | Ring position of the amino group | L³ |
|---|---|---|---|---|---|
| 145 | 4-HO₃S-C₆H₄– | H | C₂H₅ | 5 | –C₆H₄–SO₃H (isomer mixture) |
| 146 | 3-SO₃H-C₆H₄– | H | C₂H₅ | 5 | 3-SO₃H-4-CH₃-C₆H₃– |
| 147 | 3-SO₃H-C₆H₄– | H | C₂H₅ | 4 | 3-SO₃H-4-CH₃-C₆H₃– |
| 148 | 3-SO₃H-C₆H₄– | H | H | 5 | 3-SO₃H-C₆H₄– |
| 149 | 3-SO₃H-C₆H₄– | H | C₂H₅ | 4 | –C₆H₄–SO₃H (isomer mixture) |
| 150 | 3-SO₃H-C₆H₄– | H | C₂H₅ | 4 | –C₆H₄–SO₃H (isomer mixture) |

EXAMPLE 151

The aqueous paste from Example 137a was dissolved in 350 ml of water, and 38 g of 2-(N-ethyl-N-phenylamino)-4-chloro-6-(3'-amino-4-hydroxysulfonylphenylamino) triazine were added. Under the synthesis conditions of Example 61, the dye of the formula

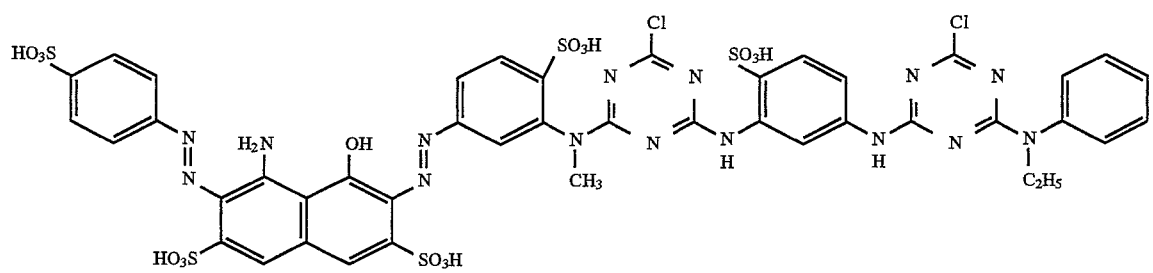

was obtained, which prints cotton and rayon staple by the conventional reactive printing in a reddish blue hue with comparable depth and with a high fixing yield and good allround fastnesses.

The dyes of Table 7, which have comparable properties, are obtained in a similar manner.

TABLE 7

| Ex. No. | D | L¹ | L² | L³ | Ring position of the amino group |
|---|---|---|---|---|---|
| 152 | 4-HO₃S, 2-SO₃H phenyl | H | C₂H₅ | phenyl | 5 |
| 153 | 4-HO₃S, 2-SO₃H phenyl | H | C₂H₅ | phenyl | 4 |
| 154 | 4-HO₃S phenyl | CH₃ | C₂H₅ | 4-SO₃H, 3-CH₃ phenyl | 5 |
| 155 | 3-SO₃H phenyl | H | H | 3-SO₃H phenyl | 4 |
| 156 | 4-HO₃S, 2-SO₃H phenyl | H | H | H | 5 |
| 157 | 4-HO₃S, 2-COOH phenyl | H | CH₃ | 2-COOH phenyl | 4 |

TABLE 7-continued

[Structure: complex azo dye with D-N=N-, H₂N, OH, SO₃H groups on naphthalene, linked through azo and triazine groups with substituents L¹, L², L³]

| Ex. No. | D | L¹ | L² | L³ | Ring position of the amino group |
|---|---|---|---|---|---|
| 158 | 2-COOH, 4-HO₃S-phenyl | H | C₂H₅ | phenyl | 4 |
| 159 | 3-SO₃H-phenyl | H | C₂H₅ | 4-SO₃H-phenyl | 4 |
| 160 | 3-SO₃H-phenyl | H | C₂H₅ | 4-SO₃H-phenyl | 5 |
| 161 | 2-COOH-phenyl | CH₃ | H | 4-SO₃H-phenyl | 5 |
| 162 | 2-COOH-phenyl | CH₃ | H | 4-SO₃H-phenyl | 4 |

EXAMPLE 163

The dye of the formula

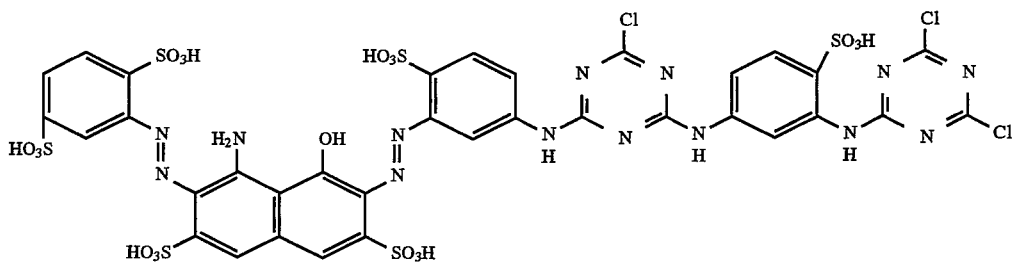

obtained as an intermediate in Example 1c was precipitated from aqueous solution with 1500 ml of ethanol, filtered off with suction, washed with 80% strength by weight aqueous ethanol and dried at room temperature under reduced pressure.

Yield: 23 g (the dye contained small amounts of a hydrolysis product of the dye in addition to a little sodium chloride.)

The dye can be used to print cotton and rayon staple in the same depth of color. The white ground is not stained.

The dyes shown in Table 8 are obtained in a similar manner. As in the case of the dye from Example 163, they have high fixing rates.

The sulfo and the amino group are alternatively in ring positions 4 and 5.

TABLE 8

[Structure: D−N=N−[naphthalene with H₂N, OH, HO₃S, SO₃H substituents]−N=N−[phenyl with HO₃S]−NH−C(Cl)=N−[triazine with N⁴]=C−NH−[phenyl with SO₃H]−N(R)−C=N−[triazine with Cl]=C−Cl]

| Ex. No. | D | Ring position of SO₃H | R |
|---|---|---|---|
| 164 | 4-SO₃H, 2-SO₃S-phenyl (benzene with SO₃H and SO₃S) | 4 | CH₃ |
| 165 | 2-CH₃, 4-SO₃H, 5-HO₃S-phenyl | 4 | H |
| 166 | 2-CH₃, 4-SO₃H, 5-SO₃H-phenyl | 4 | CH₃ |
| 167 | 2-CH₃, 4-SO₃H, 5-SO₃H-phenyl | 5 | CH₃ |
| 168 | 2,5-di(HO₃S)-phenyl (SO₃H at 2 and 5) | 4 | H |
| 169 | 2,5-di(HO₃S)-phenyl | 4 | CH₃ |
| 170 | 2-COOH, 5-SO₃H-phenyl | 4 | CH₃ |
| 171 | 2-SO₃H, 3-CH₃, 5-HO₃S-phenyl | 4 | H |
| 172 | 2-COOH, 3-SO₃H, 5-HO₃S-phenyl | 4 | H |
| 173 | 4-SO₃H, 2-SO₃H-phenyl | 5 | CH₃ |

We claim:
1. A disazo dye of the formula I

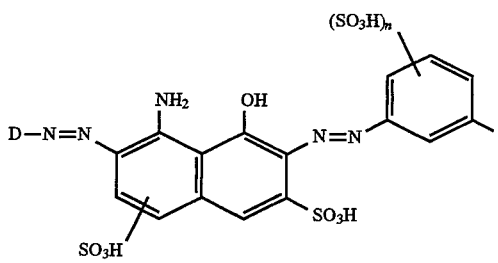

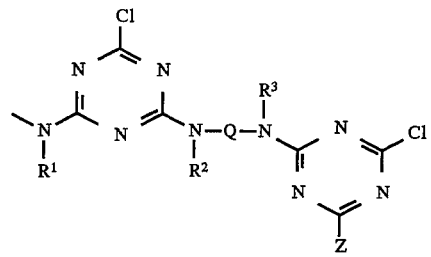

where n is 0, 1 or 2,

D is unsubstituted or substituted phenyl or unsubstituted or substituted naphthyl, $R^1$ and $R^2$ independently of one another, are each hydrogen or unsubstituted or substituted $C_1$–$C_4$-alkyl, $R^3$ is hydrogen, Z is a radical of the formula $NR^4R^5$, where $R^4$ is hydrogen or unsubstituted or substituted $C_1$–$C_4$-alkyl and $R^5$ is hydrogen, unsubstituted or substituted $C_1$–$C_4$-alkyl or unsubstituted or substituted phenyl, and Q is a radical of the formula

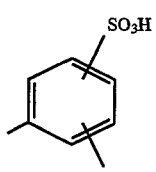

with the proviso that a) from five to seven groups which impart water solubility are present in the molecule wherein the substituents on the substituted phenyl or substituted naphthyl are selected from the group consisting of $C_1$–$C_4$-alkyl, $C_1$–$C_4$-alkoxy, amino, halogen, hydroxysulfonyl, carboxyl, sulfamoyl, $C_1$–$C_4$-mono- or dialkylsulfamoyl, whose alkyl radicals are unsubstituted or substituted by hydroxyl, and $C_1$–$C_4$-alkylsulfonyl, which is unsubstituted or substituted by hydroxyl; and wherein the substituents on said substituted $C_1$–$C_4$-alkyl are selected from the group consisting of hydroxyl, $C_1$–$C_4$-alkoxy, hydroxy-$C_1$–$C_4$-alkoxy, sulfato, halogen, $C_1$–$C_4$-alkoxycarbonyl, cyano, carboxyl and hydroxysulfonyl; and wherein the groups which impart water solubility are selected from the group consisting of carboxyl and hydroxysulfonyl.

2. A disazo dye as claimed in claim 1, wherein six or seven groups which impart water solubility are present in the molecule.

3. A disazo dye as claimed in claim 1, wherein Z is a radical of the formula $NR^4R^5$.

4. A disazo dye as claimed in claim 1, wherein Z is chlorine.

5. A disazo dye as claimed in claim 1, wherein $R^1$, $R^2$, $R^3$ and $R^4$, independently of one another, are each hydrogen or $C_1$–$C_4$-alkyl.

6. A disazo dye as claimed in claim 1, wherein $R^5$ is $C_1$–$C_4$-alkyl which is unsubstituted or substituted or is phenyl which is unsubstituted or monosubstituted to trisubstituted by methyl, methoxy, carboxyl or hydroxysulfonyl.

7. A disazo dye as claimed in claim 1, wherein D is unsubstituted or substituted phenyl.

8. A disazo dye as claimed in claim 1, which is of the formula Ia

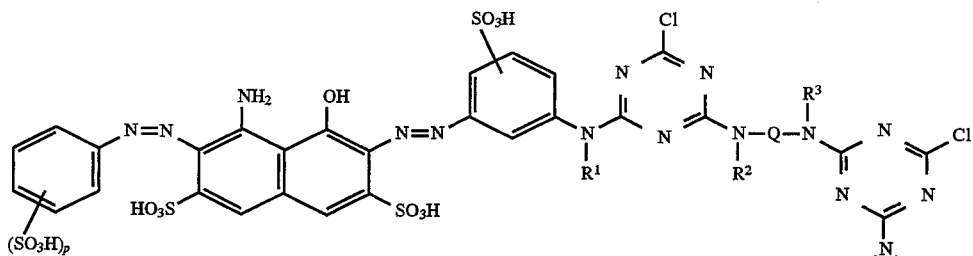 (Ia)

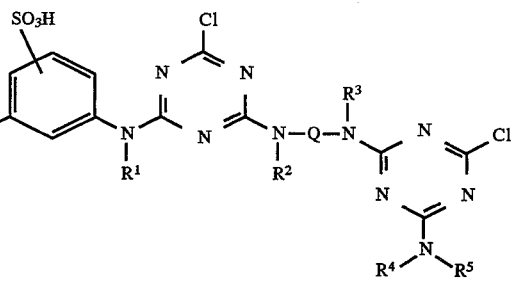

where p is 1 or 2 and Q, $R^1$, $R^2$, $R^3$, $R^4$ and $R^5$ each have the meanings stated in claim 1.

9. A disazo dye as claimed in claim 1, which is of the formula Ib

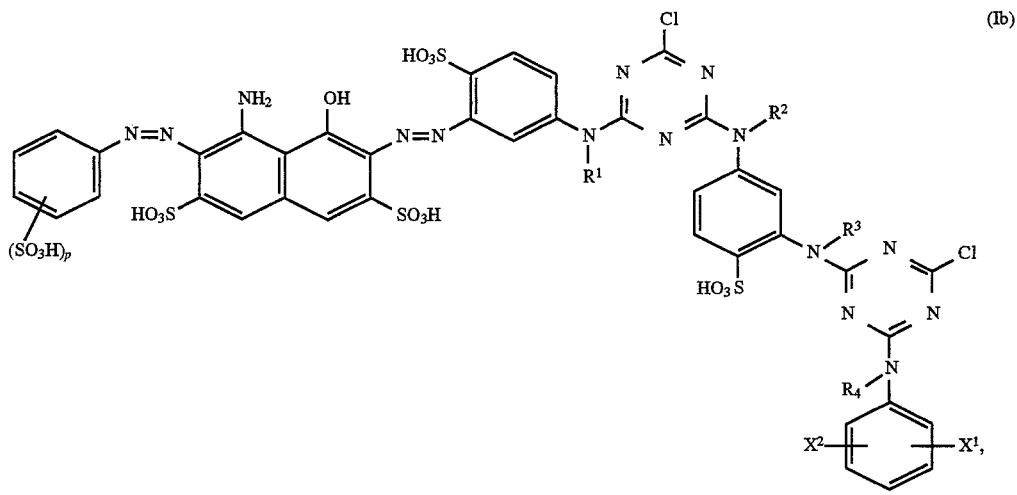
where p is 1 or 2, $X^1$ is hydrogen, carboxyl or hydroxysulfonyl and $X^2$ is hydrogen, methyl, methoxy, carboxyl or hydroxysulfonyl and $R^1$, $R^2$, $R^3$ and $R^4$ each have the meanings stated in claim 1.
* * * * *